United States Patent [19]

Harrington

[11] Patent Number: 5,631,748
[45] Date of Patent: May 20, 1997

[54] COLOR IMAGES HAVING MULTIPLE SEPARATIONS WITH MINIMALLY OVERLAPPING HALFTONE DOTS AND REDUCED INTERPIXEL CONTRAST

[75] Inventor: Steven J. Harrington, Holley, N.Y.

[73] Assignee: Xerox Corporation, Stamford, Conn.

[21] Appl. No.: 559,323

[22] Filed: Nov. 16, 1995

[51] Int. Cl.$^6$ .................................................. H04N 1/46
[52] U.S. Cl. ...................... 358/502; 358/535; 358/536; 358/520; 347/251; 395/109
[58] Field of Search ................................. 358/515, 534, 358/535, 536, 518, 529, 502, 457, 298, 520, 501, 503, 456; 395/131, 109, 108; 382/167; 347/251, 250, 246, 282, 131, 240; H04N 1/46

[56] References Cited

U.S. PATENT DOCUMENTS

| | | | |
|---|---|---|---|
| 4,149,194 | 4/1979 | Holladay | 358/298 |
| 4,275,413 | 6/1981 | Sakamoto et al. | 358/525 |
| 4,620,198 | 10/1986 | Behun | 347/43 |
| 4,899,181 | 2/1990 | Hawkins | 347/63 |
| 5,416,612 | 5/1995 | Ingraham et al. | 358/501 |
| 5,473,446 | 12/1995 | Perumal, Jr. et al. | 358/523 |
| 5,479,263 | 12/1995 | Jacobs et al. | 358/298 |
| 5,500,661 | 3/1996 | Matsubara et al. | 347/41 |
| 5,519,815 | 5/1996 | Klassen | 395/109 |

FOREIGN PATENT DOCUMENTS

| | | |
|---|---|---|
| 237154 | 12/1989 | Japan . |
| 156286 | 3/1996 | Japan . |

OTHER PUBLICATIONS

Po–Chieh Hung, "Tetrahedral Division Technique Applied to Colorimetric Calibration for Imaging Media"; Annual Meeting IS&T; NJ; May, 1992; pp. 419–422.

Po–Chieh Hung, "Colorimetric Calibration for Scanners and Media", SPIE, vol. 1448; Camera and Input Scanner System (1991).

Sigfredo I. Nin et al., "Printing CIELAB Images on a CMYK Printer Using Tri–Linear Interpolation", SPIE Proceedings, vol. 1670, 1992, pp. 316–324.

Primary Examiner—Kim Vu
Assistant Examiner—Fan Lee
Attorney, Agent, or Firm—Mark Costello

[57] ABSTRACT

Halftone screens are generated for each separation in accordance with the goal of avoiding overlapping whenever possible. Initially, the black separation is halftoned, generating a dot pattern with a number of ON pixels and OFF pixels in accordance with the area density of the black separation. Next, a first color separation is halftoned, setting a number of the previous OFF pixels to ON. Then, if any white pixels remain, the second color separation is halftoned, setting a number of the previously OFF pixels to ON. If during the processing of the second and third separations, it is determined that no OFF pixels exist to be turned ON, a second layer of color is started, respectively superimposed over the first layer. The third color separation is halftoned in reverse fill-in order, setting a number of the previous OFF pixels to ON. Each layer is started and arranged so that the additional colors forming the dot pattern are not placed on any black areas.

7 Claims, 4 Drawing Sheets

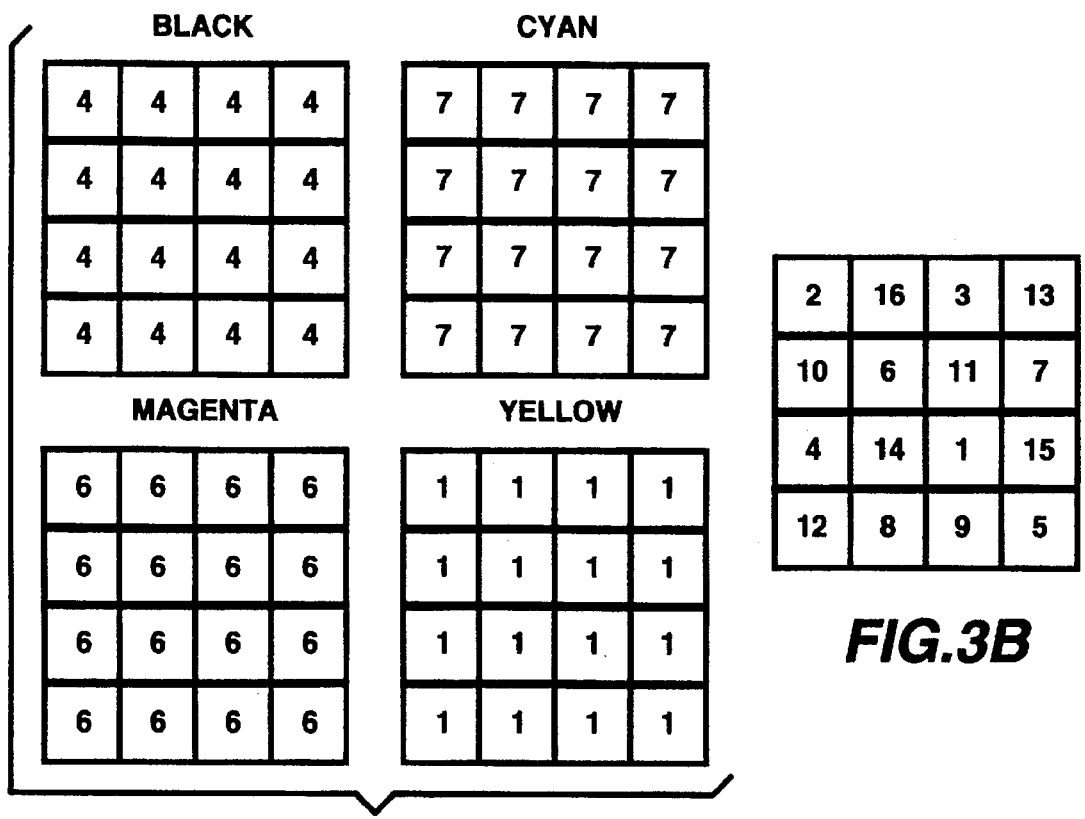
*FIG.3A*
*FIG.3B*
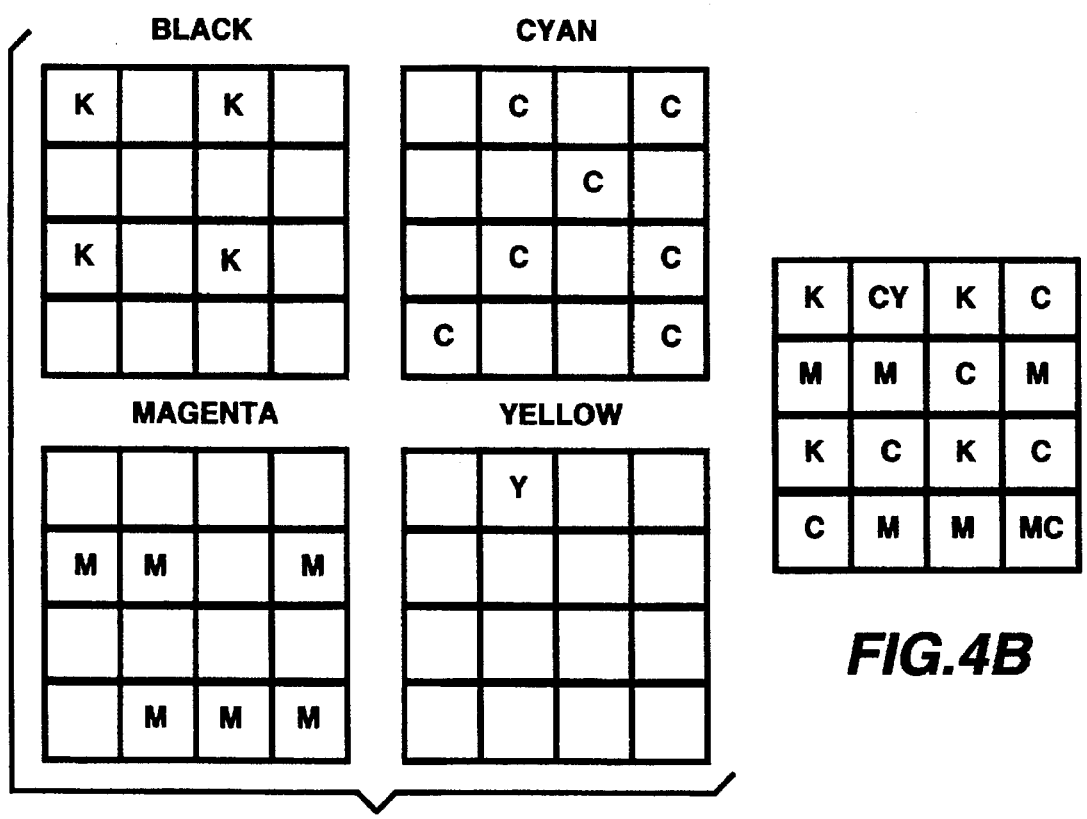
*FIG.4A*
*FIG.4B*

COLOR IMAGES HAVING MULTIPLE SEPARATIONS WITH MINIMALLY OVERLAPPING HALFTONE DOTS AND REDUCED INTERPIXEL CONTRAST

This invention relates to binarization of multiple separation contone color images, and more particularly, methods for assuring that from separation to separation, overlap of separation halftone dots is minimized and undue contrast is avoided.

BACKGROUND OF THE INVENTION

Color images are commonly represented as a one or more separations, each separation comprising a set of color density signals for a signal primary or secondary color. The color density signals are commonly represented as digital gray or contone pixels, varying in magnitude from a minimum to a maximum, with a number of gradations between corresponding to the bit density of the system. Thus, a common 8 bit system provides 256 shades of each primary color. A color can therefore be considered the combination of magnitudes of each pixel, which when viewed together, present the combination color. Usually, printer signals include three subtractive primary colors (cyan, magenta and yellow) signals and a black signal, which together can be considered the printer colorant signals. Each color signal forms a separation, and when combined together with the other separations forms the color image Printers commonly provide a limited number of output possibilities, and are commonly binary, i.e., they produce either a spot or no spot at a given location (although multilevel printers beyond binary are known). Thus, given a color separation with 256 shades of each additive primary color, a set of binary printer signals must be produced representing the contone effect. In such arrangements, over a given area in the separation having a number of contone pixels therein, each pixel value of an array of contone pixels within the area is compared to one of a set of preselected thresholds (the thresholds may be stored as a dither matrix and the repetitive pattern generated by this matrix is considered a halftone cell) as taught, for example, in U.S. Pat. No. 4,149,194 to Holladay. The effect of such an arrangement is that, for an area where the image is a contone, some of the thresholds within the dither matrix will be exceeded, i.e. the image value at that specific location is larger than the value stored in the dither matrix for that same location, while others are not. In the binary case, the pixels or cell elements for which the thresholds are exceeded might be printed as black or some color, while the remaining elements are allowed to remain white or uncolored, dependent on the actual physical quantity described by the data.

Several spots together form a halftone dot pattern. These dot patterns are carefully designed to system requirements, so that the system optimally reproduces the image. In electrophotographic systems, which have great difficulty in reproducing isolated spots (e.g. a black spot surrounded by white spots), the dot pattern is designed so that increasing densities produce an increasing number of black spots clustered together. By contrast, ink jet printing produces isolated dots reasonably well, and so the requirement of clustering can be relaxed in favor of other requirements.

In electrophotographic systems, with the clustered dot requirement, registration between separations is difficult to achieve. Accordingly, since minor registration errors would result in the development of undesirable moire patterns, the screens of each separation are rotated with respect to other another, as in the above described reference to Holladay. In current ink jet printers which have very good separation to separation registration, moire patterns are not a problem. Accordingly, the dot patterns can be placed in registration, one on top of the other.

Given reduction in the above constraints, other goals can be addressed to optimize system reproduction, one of which is the maximization of gamut of the color printer. Because inks are not ideal, the color produced by two ink dots laid on top of one another is different from the color produced by the placement of the dots in side by side relationship. The greatest gamut is produced in the latter case, when overlap of inks is minimized.

A second goal of dot pattern design is to improve edge definition. Edges, characterized by abrupt changes in color or density within a small area of the image, are well defined in the inked portion of a halftone dot, but are lost in white areas between dots. The amount of white space will be larger as the separations which contribute to the color at the edge are formed with overlapping dots. However, if separations forming the edge contribute to the color combination with dots in side by side relationship, there would be less white space, and a greater chance that an edge would overlap one of the side by side dots, providing improved edge rendition.

A third goal of dot pattern design is to decrease local concentrations of ink. Problems such as puddling or bleeding of ink occur if there is to much ink within a small area. It would be preferable to have a uniform layer of a moderate amount of ink rather than areas of heavy coverage mixed with areas of no coverage at all.

These goals are in large part accomplished in the inventor's own U.S. patent application Ser. No. 08/102,329 to Harrington now patented, U.S. Pat. No. 5,493,323. Halftone screens are generated for each separation in accordance with the goal of avoiding overlapping whenever possible. Initially, the black separation is halftoned, generating a dot pattern with a number of ON pixels and OFF pixels in accordance with the area density of the black separation. Next, a first color separation is halftoned, setting a number of the previous OFF pixels to ON. Then, if any white pixels remain, the second color separation is halftoned, setting a number of the previously OFF pixels to ON. After the second color separation is halftoned, if any OFF pixels remain, the third color separation is halftoned, setting a number of the previous OFF pixels to ON. If during the processing of the second and third separations, it is determined that no OFF pixels exist to be turned ON, second and (if needed) third layers of color are started, respectively superimposed over the first layer and then, if required, superimposed over the second layer. Each layer is started and arranged so that the additional colors forming the dot pattern are not placed on any black areas. Note however, that application describes the order used to place separation colors as from dark to light. The described system places black first, followed by magenta, cyan, and finally, yellow. This order tends to preserve the dot shape for a clustered dot, However, for a dispersed dot pattern, such as those used with ink jet printing, it may be desirable instead to reduce luminance contrast as much as possible. Reducing the contrast between pixels makes the individual dots less visible, and provides the image with a smoother texture.

All of the references cited herein are incorporated by reference for their teachings.

SUMMARY OF THE INVENTION

In accordance with the invention, there is provided a method of preparing a color document initially defined in terms of contone image signals to binary image signals, using a halftoning process that minimizes overlap of colors within a halftone dot area and simultaneously reduces interpixel contrast.

In accordance with the invention, halftone screens are generated for each separation in accordance with the goal of avoiding overlapping whenever possible, but also with the goal of reducing interpixel contrast. Initially, the black separation is halftoned, generating a dot pattern with a some number of ON pixels and OFF pixels in accordance with the area density of the black separation. Next, the magenta is halftoned, setting a number of the previous OFF pixels to ON, with a fill order starting where the black separation ended. Then, if any white pixels remain, the cyan separation is halftoned, setting a number of the previously OFF pixels to ON, with a fill order starting where the magenta separation ended. If it is necessary to overlap ON pixels, the overlapping portion starts with the magenta separation. After the cyan separation is halftoned, the yellow separation is halftoned. However, in this case, the fill order is reversed. Initially, any OFF pixels remaining are set to ON. Next however, if it is necessary to overlap ON pixels, the overlapping starts with pixels turned in only the cyan separation. Magenta pixels are only overlapped after all the cyan pixels are overlapped.

In accordance with another aspect of the invention, in addition to using the above dot pattern generating fill sequence, undercolor removal is selectively used to optimize the dot appearance. Black is increased or reduced in association with color increase or decrease, to allow the appropriate space for filling with reduced luminance contrast. For a dispersed dot, such as those used with ink jet printing, it may be desirable to reduce luminance contrast as much as possible. Reducing the contrast between pixels makes the individual dots less visible, and provides the image with a smoother texture. The proposed filling strategy that operates to reduce luminance contrast by overprinting the two lighter colors (yellow and cyan), giving green, and magenta. These colors have less contrast in their luminance space terms. The invention reduces contrast by placing the yellow ink in the reverse order from the other inks, i.e., the last pixel of the halftone cell ordering used to fill black, magenta, and/or cyan, will be the first pixel of the cell to be colored by the yellow.

These and other aspects of the invention will become apparent from the following descriptions to illustrate a preferred embodiment of the invention read in conjunction with the accompanying drawings in which:

FIG. 1 is a schematic illustration of pertinent elements of a scan to print system in which the present invention may find use;

FIG. 2 schematically illustrates the generation of printer colorant signals, on which the present invention operates;

FIG. 3A shows a set of sample areas from plural separations, and FIG. 3B shows a simple 4×4 halftone cell of threshold values;

FIG. 4A shows a set of dots derived from the sample areas and halftone cell of FIGS. 3A and 3B, while FIG. 4B shows their arrangement in overlapping or printed relationship.

Figure 1:
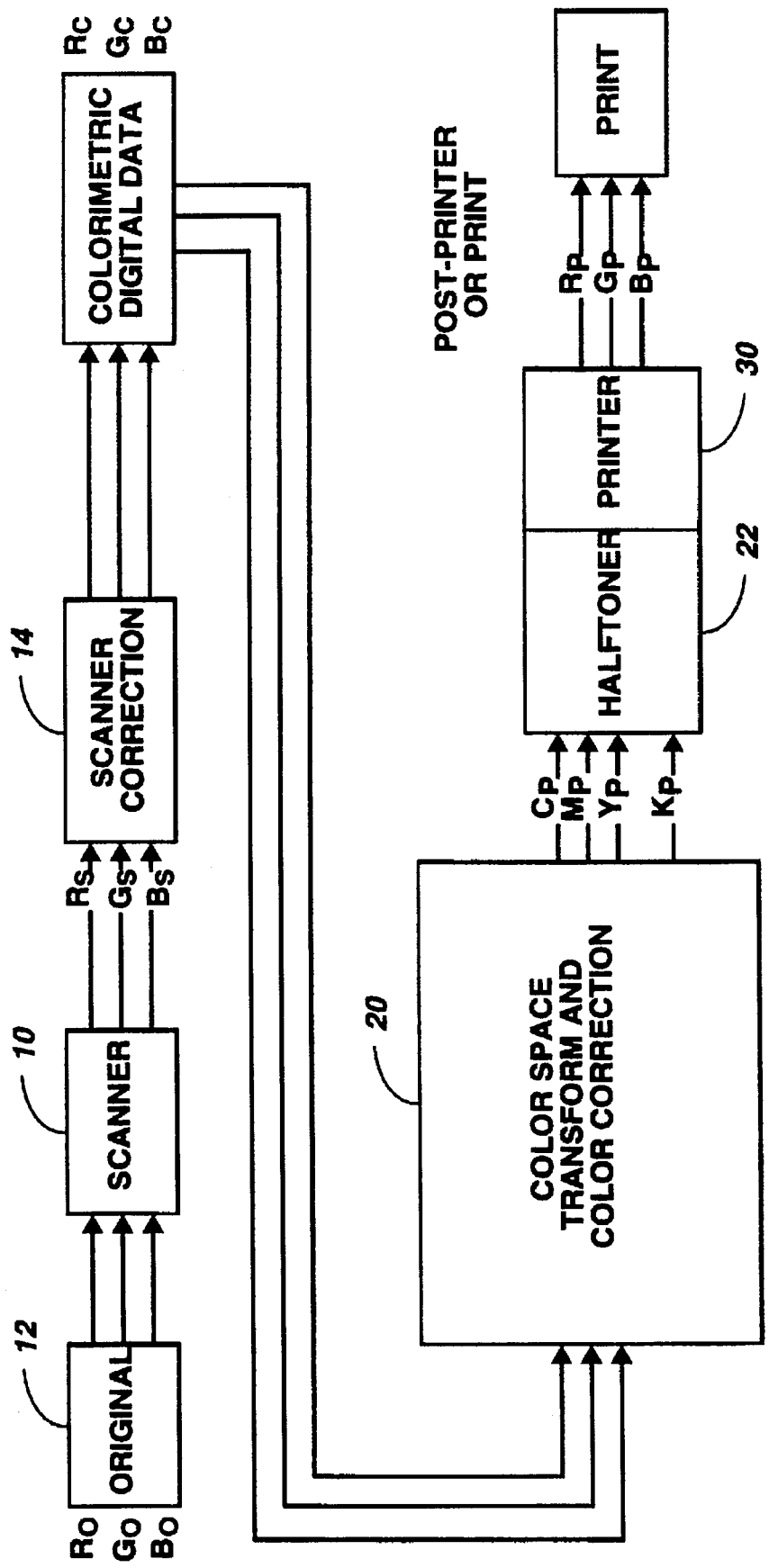

Referring now to the drawings where the showings are for the purpose of describing an embodiment of the invention and not for limiting same in the particular color system to be discussed, color documents are represented by multiple sets of image signals, each set (or separation) represented by an independent channel, which is processed more or less independently from other separations or channels. A "color image" as used herein is therefore a document including at least two, and commonly three or four separations, each separation providing a corresponding set of image signals which will drive a printer to produce one color of the image, and which separations together form the full color image. In this context, we will describe pixels as discrete image signals, which describe optical density of the document image in a given small area thereof. The term "pixel" will be used to refer to such an image signal in each separation. Pixels are commonly "contone" when received, which for the purposes of this discussion refers to a multibit defined pixel.

One suitable printing system might be a color ink jet printer, such as the devices described in U.S. Pat. Nos. 4,620,198 and 4,899,181, incorporated herein by reference.

Referring now to the drawings where the showings are for the purpose of describing an embodiment of the invention and not for limiting same, a basic system for carrying out the present invention is shown in FIG. 1. In a simple system model, a scanner 10, which can be calibrated to produce a set of digital colorimetric or device independent data describing a scanned image 12, which, by definition can be defined in terms of r g b space. Resulting from the scanning operation is a set of scanner image signals Rs, Gs, Bs, defined in device dependent scanner terms. Incorporated into the scanner or another processing path is a post-scanning processor 14, which provides correction of scanner image signals Rs, Gs, Bs to colorimetric terms, typically digital in nature Rc, Gc, Bc. The values may be in terms of CIE color space (rgb), or the L*a*b* luminance-chrominance space (LC1C2). A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant values Cp, Mp, Yp, Kp. These signals are halftoned at halftoning processor 22, and will be used to drive a printer 30. In one possible example, the colorant values represent the relative amounts of cyan, magenta and yellow toners that are to be deposited over a given area. The printed output image may be said to be defined in terms of Rp, Gp, Bp, which is hoped to have a relationship with Ro, Go, Bo, such that the printer has a color that is colorimetrically similar to the original image, although that similarity is ultimately dependent upon the gamut of the printing device.

Figure 2:
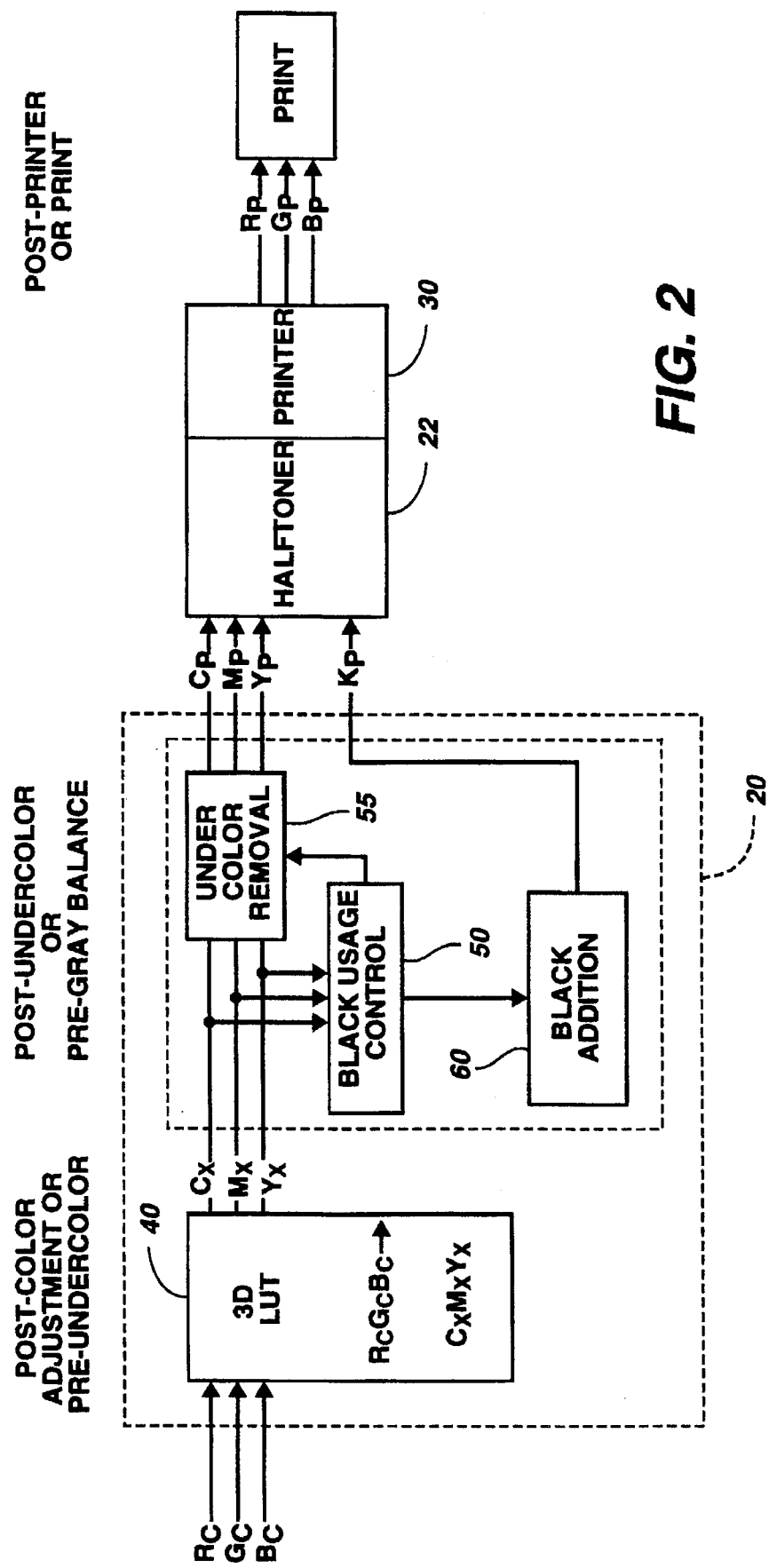

With reference now to FIG. 2, and color space transformation and color correction 20, initially, Rc, Gc, Bc color signals are directed to a three dimensional look up table 40 stored in a device memory such as a ROM or other addressable memory device, which will meet speed and memory requirements for a particular device. Color signals Rc, Gc, Bc are processed to generate address entries to table 40 which stores a set coefficients with which the Rc, Gc, Bc may be processed to convert them to Cx, Mx, Yx colorant signals. Values which are not mapped may be determined through interpolation.

There are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values. The values stored in the look-up table can be empirically derived, as in Sakamoto, or calculated or extrapolated based on empirical information, as in Po-Chieh Hung, "Tetrahedral Division Technique Applied to Colorimetric Calibration for Imaging Media", Annual Meeting IS&T, NJ, May, 1992, pp. 419–422; Po-Chieh Hung, "Colorimetric Calibration for Scanners and Media", SPIE, Vol. 1448, Camera and Input Scanner System, (1991); and Sigfredo I. Nin, et al., "Printing CIELAB Images on a CMYK Printer Using Tri-Linear Interpolation", SPIE Proceedings, Vol. 1670, 1992, pp. 316–324. The construction of the set of values stored for the present invention will be discussed hereinbelow.

With reference to FIG. 2, upon obtaining device dependent colorant signals Cx, Mx, Yx, black addition (K+) is performed in two steps. At a first processor 50 the density of the cyan, magenta, and yellow signals is determined, in order to control black usage, as will be discussed further below. Under color removal processing 55 may be accomplished at this point. Full under color removal is usually dependent upon the minimum density of the cyan, magenta and yellow signals. Black addition 60 is responsive to black usage control to generate a black colorant signal as a function thereof.

Alternatively, it is possible to combine the black addition and undercolor removal with the color correction process by using a three-dimensional look-up table containing values for all four colorants.

Accordingly, in one embodiment of the invention, a set of contone image signals are derived representing the cyan, magenta, yellow and black separations. FIGS. 3A, 3B, 4A and 4B, illustrate the principle operation of the invention. Four separation signals representing the black, cyan, magenta and yellow separations are represented in FIG. 3A, with the possible densities shown. In the example, uniform densities are shown, although, the invention contemplate partial dotting as well.

For the purposes of simplicity, a 4 bit system is assumed, with 17 possible densities 0 to 16, and a 4×4 halftone cell is assumed, with the thresholds varying from 1 to 16 through the dispersed dot screen cell as shown in FIG. 3B. FIG. 4A illustrates the output response of the thresholding process, which produces a dot pattern for each separation, each dot pattern made up of spots at locations where the contone image signal exceeds the threshold value. The described method establishes the positions of the black spots initially, and then places the colored spots for each separation in locations within the cell that do not overlap the black spots. FIG. 4B shows the 4 separation dot patterns as they are printed, with little overlap occurring, and limited to the color portions of the dot patterns.

The way in which this placement of spots within the separation dot patterns is achieved is by adding the magnitude of previously placed colors to the color currently being placed, so that when compared to the halftone threshold, the pixel is set to ON "beyond" the previously placed pixels in other separations (at higher thresholds than would be exceeded given the magnitude of the image signals). The summed magnitude is also compared to the maximum threshold for the system, so that any excess pixels may be carried to a second or third layer of color. To avoid printing over black, spots for the second and third layers are started after any black pixels.

The yellow signals are operated on so the dot filling operation is the reverse of that for black, magenta and cyan. Initially, yellow spots are put in OFF positions, and upon filling those positions, yellow spots are placed over cyan spots, and secondarily over magenta spots. The proposed filling strategy operates to reduce luminance contrast by preferentially overprinting the two lighter colors (yellow and cyan), giving green and magenta. These colors have less contrast in their luminance space terms. The invention reduces contrast by placing the yellow ink in the reverse order from the other inks, i.e., the last pixel of the halftone cell ordering used to fill black, magenta, and/or cyan, will be the first pixel of the cell to be colored by the yellow.

This process may be better shown by the below procedure which actually carries the process out. A program fragment to carry out the inventive halftoning process written in the "C" programming language follows. The procedure takes in color values for cyan, magenta, yellow and black at a pixel (c,m,y,k) and pixel position (i,j). It makes use of a halftone threshold procedure threshold(i,j) that produces a halftone threshold appropriate for a pixel at position (i,j). The result is conveyed by setting the output value v of each color separation to either 0 (no ink) or 1 (ink) via the procedures cout(i,j,v), mout(i,j,v), yout(i,j,v) and kout(i,j,v). The maximum value that a pixel can have is maxval.

```
Halftone(c,m,y,k,i,j)
{int t=threshold(i,j);
if (k>=t)kout(i,j,1); else kout(i,j,0);
m+=k;
if((m>=t)&&(k<t))mout(i,j,1);else mout(i,j,0);
c+=m;
if((c>=t)&&(m<t))cout(i,j,1); else cout(i,j,0);
if (c>maxval)
{c=c-maxval +k;
    if((c>=t)&&(k<t))cout(i,j,1);}
if((maxval-y)<t)yout(i,j,1);else yout(i,j,0);
}
```

The assumptions are made that the cyan, magenta, yellow and black ink amounts are the amounts which should actually be seen. In particular, it assumes that the amount of black plus that of any other color never exceeds the maximum ink value (i.e., there never needs to be overlap of black with any other color. It is also possible to provide less than four separations, and to provide a system without a black separation.

Figure 5:
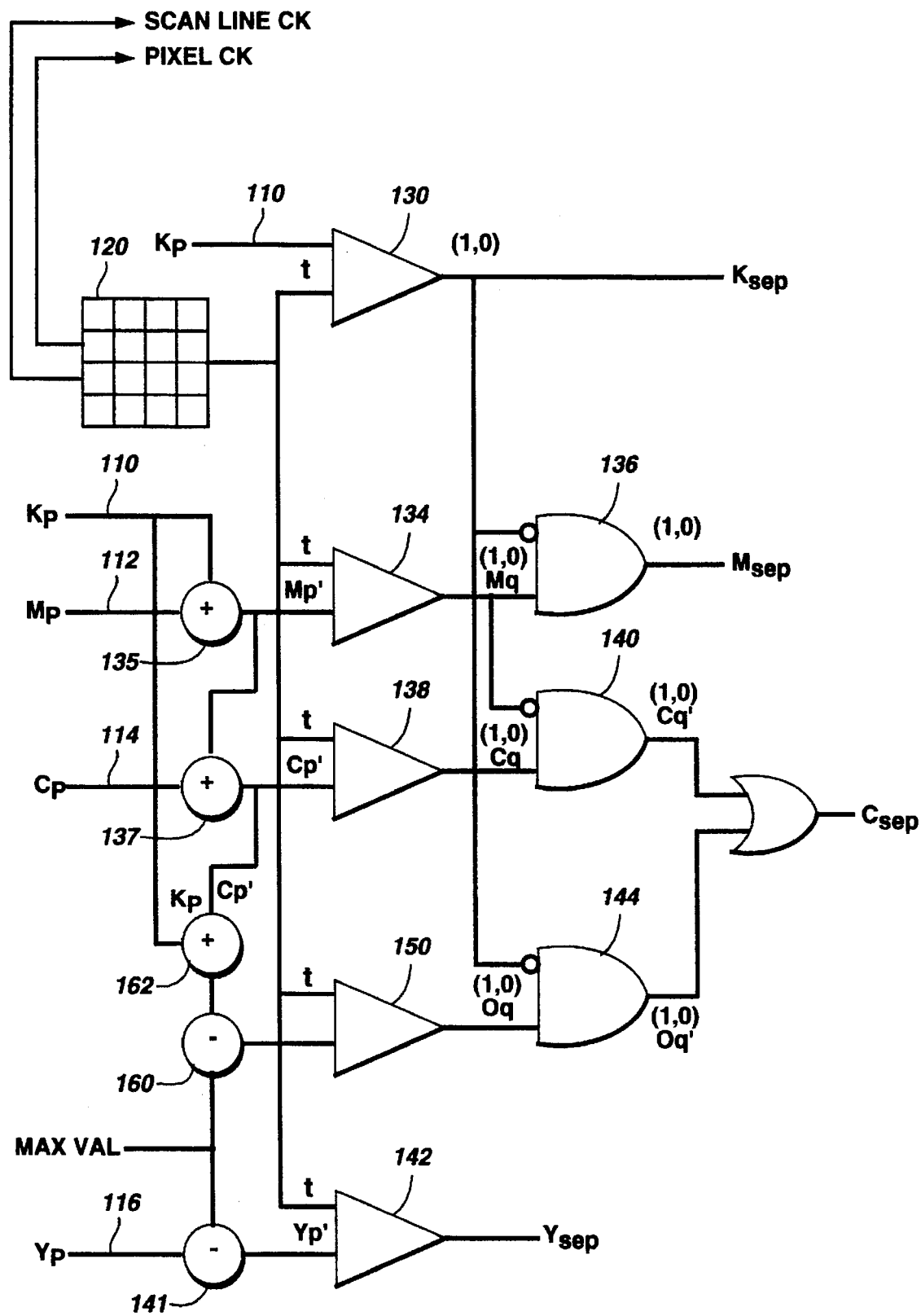
FIG. 5 illustrates a functional block diagram of a system for accomplishing the present invention.

With reference now to FIG. 5, a block diagram of the proposed system is shown. Within printer 30 is found the inventive halftoning apparatus. Accordingly, a set of separation image signals Kp, Mp, Cp and Yp are received by the halftoning system at inputs 110, 112, 114, and 116. Stored in printer memory 120, which can be ROM and RAM type memory, is a halftone cell for the particular halftoning application, in this case illustrated as a simple 4×4 array. The halftone cell provides threshold values t against which each separation image signal will be compared. Appropriate threshold values for a given location i,j in the image are returned based on the pixel clock and scan line clock signals directed to memory 120. The halftone cell memory returns a value t responsive to the appropriate clock signals. While for the purpose of illustration the halftone cell has been described as an array of threshold values, note that other implementations are possible. All that is actually required is some threshold generating mechanism which produces a threshold value for each pixel.

Initially t(i,j) is directed to comparator 130, which has as a second input black separation signal $K_p$. The output of comparator 130 depends on whether $K_p$ is greater than t(i,j). If it is, it returns a signal $K_{sep}$ indicating that case, in the current example, i.e. presented as a signal of 1 or 0, which will cause the printer to place a spot or no spot at position i,j when it is printing the black separation.

The same pixel clocking also directs t(i,j) to comparator 134. Comparator 134 has as a second input the sum of signals $K_p$ and $M_p$ from signal adder 135, which serve to increase the magnitude of signal $M_p$, if signal $K_p$ has a non-zero value, to $M_{p'}$. Accordingly, signal $M_{p'}$ will exceed a higher threshold than otherwise would be the case. The output of comparator 134 depends on whether signal $M_p$ is greater than t(i,j). If it is, comparator 134 returns a signal $M_q$ indicating that case, in the current example a 1 or 0. In the case of the magenta separation halftoning, $M_q$ is also pairwise logically ANDed at AND gate 136 with the output of comparator $K_{sep}$, to assure that the magenta pixel, $M_{sep}$, that is printed will not overlap a black pixel.

In a like manner, t(i,j) is directed to comparator 138, which have as second inputs the sum of $M'_p$ and $C_p$ from adder 137. The output $C_q$ of comparator 138 is pairwise logically ANDed at AND gates 140 with the output of comparator 134, respectively, to assure that the cyan pixels are not printed over the magenta or black pixels, respectively.

Overlap is determined at subtractor 160, which receives $K_p + C_p'$ from adder 162. The combination of $K_p + C_p'$ and MAXVAL for the system, is compared to t(i,j) at comparator 150. The resulting signal $O_q$ is directed to AND gate 144 and logically ANDed with $K_{sep}$ to assure no overlap of the black separation, even when overlap of the magenta separation will occur. The logical result of this process, signal $O_q$, is directed to OR gate 162 for combination with the non-overlap response $C_q'$.

In accordance with the invention, the yellow separation is handled distinctly from the other separations. The yellow separation is initially subtracted from the maximum system value MAX-VAL at subtraction 141. That value, $Y_{p'}$, is then compared to the threshold t(i,j) at comparator 142. Unlike comparators 134 and 138, comparator 142 looks for values less than the threshold and produces a 1 if the Y value is less than threshold t. This inverts the fill order, so that rather than filling the dot pattern from the lowest threshold level to the highest threshold, the dot pattern is filled from the highest threshold to the lowest threshold. The result is that initially, OFF pixels are filled, and next, cyan pixels are overlapped, and finally, magenta pixels are overlapped.

In accordance with the invention, there is no equivalent overlap determination for yellow.

It will be understood that the arrangement for determining overlap will not be required for the magenta separation. There should not be any need for a second layer of the first ink, as placing ink over itself should not result in a color change.

The above described method and apparatus serve to reduce contrast between pixels. However, in certain cases, cyan, magenta and black separations do not fill the cell dot pattern with spots. In such cases, white or yellow will fill the remaining spots in the dot pattern. This is still high contrast to the other primary and secondary colors. In accordance with another aspect of the invention, for some colors, contrast can be improved by the judicious use of undercolor removal. Undercolor removal allows the replacement of equal amounts of cyan, magenta and yellow with the same amount of black or vice versa. Contrast can be reduced by not using black ink for colors that can be produced from cyan, magenta and yellow without filling the halftone cell. For darker colors, contrast is reduced by using only enough black to prevent overprinting of inks where possible.

In full undercolor removal, where given a color is specified in terms of cyan, magenta and yellow $(c_0, m_0, y_0)$ the amount of black is calculated as $k = min(c_0, m_0, y_0)$. There is no requirement, however, that a complete black substitution occurs. With black dispersion the amount of black is given by $$k = min(c_0, m_0, y_0, max(0, (c_0 + m_0 + y_0 - 1)/2))$$

In accordance with still another aspect of the invention, further limitations on the amount of black are possible, and produce improved pixel to pixel contrast. Where possible one should use enough cyan, magenta and yellow instead of black so that the cyan, magenta and remaining black fill the halftone cell. This would mean that yellow always overprints cyan and/or magenta. Thus where possible there will not be the high contrast between the light yellow and the other darker colors. The amount of black that minimizes the isolated yellow is given by $$k = min(c_0, m_0, y_0, max(0, (c_0 + m_0 + y_0 - 1)/2, c_0 + m_0 - 1))$$

After calculating the amount of black the amounts of colored inks must be adjusted to match:

$$c = c0 - k$$

$$m = m0 - k$$

$$y = y0 - k,$$

This requirement can conveniently be implemented at black usage control 50 (FIG. 3).

In many color systems, there is no black separation, in which case, the present halftoning system would be altered to operate without the black separation.

In many color systems, more than four colorants will be used. Such systems, sometimes referred to as providing "HiFi" color, use additional colorants to provide gamut extension or custom colors. Depending on the colors, the same luminance contrast problems will continue to be present. The present invention applies equally to such systems.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. An image processing system for a multicolor printer, including a halftone generator that converts contone separation signals to binary separation signals comprising:

means for receiving a plurality of contone separation signals;

means for producing a halftoning screen, having threshold values at every pixel position to be applied to contone image signals to derive a binary image signal suitable to drive a printer;

means for converting the contone signals for a black separation into black separation binary image signals in accordance with the threshold value corresponding to said signals, said converting means directing those black separation binary image signals to the printer upon completion;

means for converting contone signals for a first non-black separation into first non-black separation binary image signals, in accordance with the threshold value corresponding to said signals, said converting means directing the first non-black separation binary image signals to the printer upon completion, said means including:

offsetting means, adding the magnitude of any corresponding black separation contone signal to the magnitude of the first non-black separation contone signal; and a logic circuit, having as inputs the corresponding black separation binary signals and the first non-black separation binary image signal, and allowing the first non-black separation binary image signal to pass whenever the black separation binary signal indicates that black will not be printed;

means for converting the contone signals for a second non-black, printable ink with a colorant having a luminance value greater than that of the first non-black separation into second non-black binary signals suitable to drive a printer to print such color separations, said means including:

offsetting means, adding the magnitude of black and said first non-black contone separation signals to the magnitude of the second non-black separation image signal;

a logic circuit, having as inputs the first non-black separation binary signal and the second non-black binary signal, and logically processing said signals so that there is preferably no overlap therebetween;

means for converting the contone signals for a third non-black separation, printable ink with a colorant having a luminanee value greater than the either first or second non-black separations into color binary signals suitable to drive a printer to print such color separations, said means including:

offsetting means, subtracting the magnitude of the third non-black separation image signal the maximum contone value possible.

2. The system as described in claim 1, and including:
means for producing second non-black binary signals for printing second non-black spots preferentially where black spots and first non-black spots will not be printed, and overlapping first non-black spots, if required.

3. The system as described in claim 1, and including:
means for producing third non-black color signals for printing third non-black color spots preferentially where there are no black, first non-black, or second non-black color spots, overlapping preferentially second non-black color spots before overlapping first non-black spots if required.

4. An image processing system for a multicolor printer, including a halftone generator that converts contone separation signals to binary separation signals comprising:

means for receiving a plurality of contone separation signals describing a color image;

means for producing a halftoning screen having threshold values for a discrete area of the image to be applied to contone image signals describing a discrete area of the image to derive a binary image signal suitable to drive a printer to produce spot or no spot at each pixel locations within the discrete area;

means for producing first binary image signals describing a black separation, if any, from the contone separation signals, in accordance with the produced halftone screen thresholds, said separation describing a set of locations in the discrete area where black spots will be printed;

means for producing second binary image signals describing a first non-black color separation from the contone separation signals, in accordance with the produced halftone screen, said second binary signals producing first non-black color spots at locations where black spots will not be printed;

means for producing third binary image signals, describing a second non-black color separation, from the contone separation signals, in accordance with the produced halftone screen, said third binary signals producing second non-black color spots at locations where black spots will not be printed and preferentially where first non-black color spots will not be printed, and overlapping first non-black color spots if required;

means for producing fourth binary image signals describing a third non-black color separation, from the contone separation signals, in accordance with the produced halftone screen, which when overlapping the first non-black separation provides a high luminance contrast in comparison to said second non-black separations, said means placing said third non-black separations color spots initially at locations where no prior separation spots have been placed, and subsequently at locations overlapping the second non-black color separation spots, and finally, at locations overlapping the first color separation spots, if required.

5. In a color printing system, a method of printing a color document originally defined in terms of multi-bit signals describing color density received at a printer, the printer employing a halftone process which produces binary signals from the multi-bit signals to drive the printer to produce color spots, in accordance with color density within a halftone dot area, the steps of printing the color document at the printer including:

printing black spots, if any, within the halftone dot area, in accordance with the area density of black and a predetermined halftone fill order;

printing first separation spots within the halftone dot area at locations where there are no black spots, in accordance with the area density of the first color and a predetermined halftone fill order;

printing any next separation color spots up to but not including a final separation within the halftone dot area at locations where there are no black spots, and preferentially at locations where there are no first separation spots or previous separation spots, and printing a final separation color spot overlaying the first separation and other previous spots if required in reverse fill order.

6. In a color printing system, a method of printing a color document originally defined in terms of multi-bit signals describing color density received at a printer, the printer employing a halftone process which produces binary signals from the multi-bit signals to drive the printer to produce color spots, in accordance with color density within a halftone dot area, the steps of printing the color document at the printer including:

printing black spots within the halftone dot area, in accordance with the area density of black and a predetermined halftone fill order;

printing first separation spots with a first luminance level within the halftone dot area at locations where there are no black spots, in accordance with the area density of the first color and a predetermined halftone fill order;

printing second separation color spots with a second different luminance level within the halftone dot area at locations where there are no black spots, and preferentially at locations where there are no first separation spots, and overlaying the first separation spots if required by the area density of the next separation color;

printing third separation color spots with a luminance level greater than either the second first or second luminance levels at locations where there are no black spots, preferentially where there are no first or second separation spots, and overlaying the color spots of the first or second separation, whichever has the greater luminance level.

7. In a color printing system, a method of printing a color document originally defined in terms of multi-bit signals describing color density received at a printer, the printer employing a halftone process which produces binary signals from the multi-bit signals to drive the printer to produce color spots, in accordance with color density within a halftone dot area and under color removal the steps of printing the color document at the printer including:

determining for the image, under color removal and black addition, in a manner such that black, cyan and magenta spots will fill the halftone dot area with minimal overlap;

printing black spots within the halftone dot area, in accordance with the area density of black and a predetermined halftone fill order;

printing magenta spots within the halftone dot area at locations where there are no black spots, in accordance with the area density of magenta and the predetermined halftone fill order;

printing cyan spots within the halftone dot area at locations where there are no black spots, and preferentially at locations where there are no magenta spots, and overlapping said magenta spots as required, in accordance with an area density of cyan and the predetermined halftone fill order;

printing yellow spots at locations where there are no black spots, and overlaying said yellow spots preferentially on cyan spots separation spots, and overlaying said yellow spots on magenta spots as required, in accordance with an area density of yellow and the reverse of the predetermined halftone fill order.

* * * * *